March 9, 1943.　　　F. SURGES　　　2,313,599
SEWER AND PIPE CLEANER
Filed Sept. 11, 1940　　　2 Sheets-Sheet 1
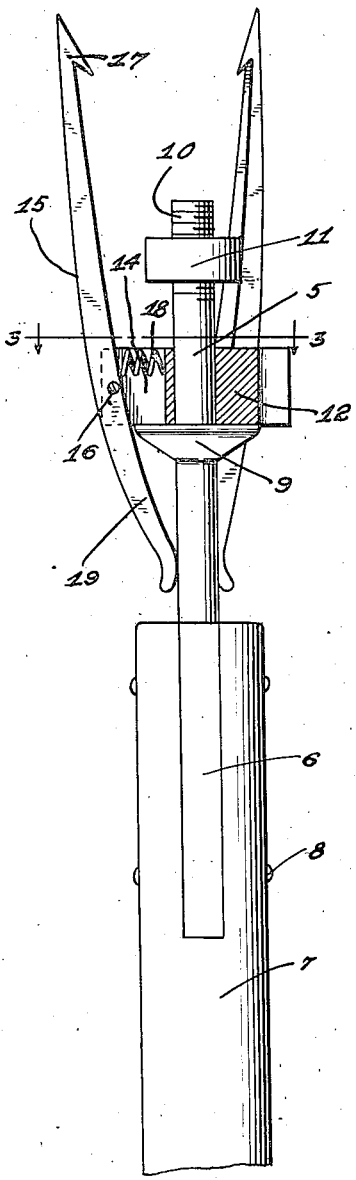
Fig.1.
Fig.4.
Fig.5.
Inventor
Frank Surges
By 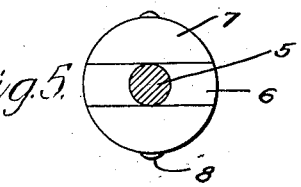
Attorney March 9, 1943.  F. SURGES  2,313,599
SEWER AND PIPE CLEANER
Filed Sept. 11, 1940  2 Sheets-Sheet 2
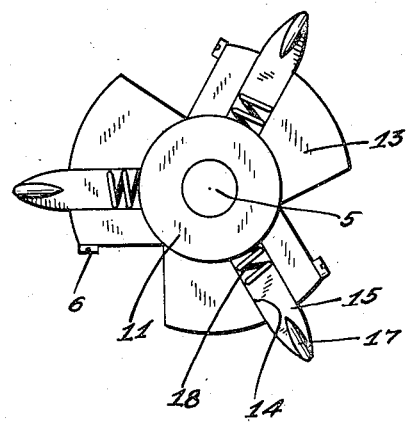
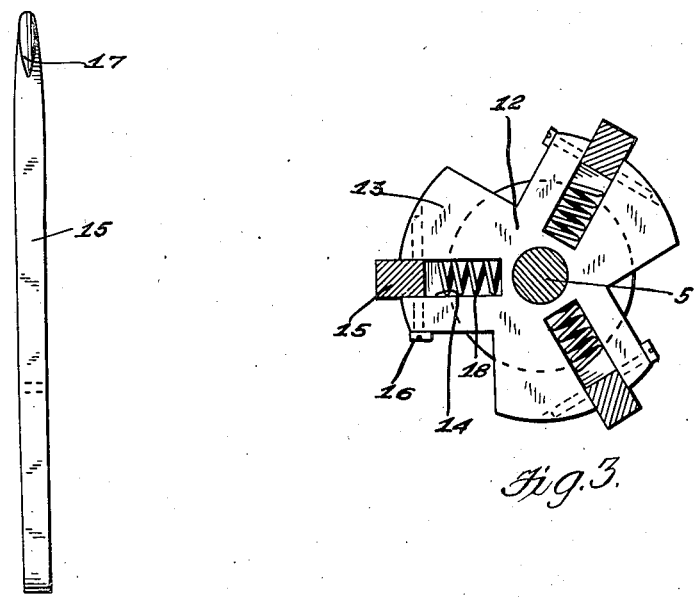
Inventor
Frank Surges
By  Clarence A. O'Brien
Attorney Patented Mar. 9, 1943

2,313,599

UNITED STATES PATENT OFFICE 2,313,599

SEWER AND PIPE CLEANER

Frank Surges, Lombard, Ill.

Application September 11, 1940, Serial No. 356,383

1 Claim. (Cl. 15—104.30)

The present invention relates to new and useful improvements in devices for removing obstructions from sewer pipes, drain lines and similar conduits, and has for its primary object to provide a gripping member adapted for insertion in the pipe and adapted to automatically engage an obstruction within the pipe and to withdraw the same therefrom upon an outward movement of the pipe cleaner.

A further object of the present invention is to provide a device of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view,

Figure 2 is an end elevational view,

Figure 3 is a transverse sectional view taken substantially on a line 3—3 of Figure 1, Figure 4 is a side elevational view with the gripping prongs removed and with the handle broken away and shown in section, Figure 5 is a transverse sectional view taken substantially on a line 5—5 of Figure 4, and Figure 6 is a side elevational view of one of the gripping prongs.

Referring now to the drawings in detail, the numeral 5 designates a shank member which is provided with a flattened inner end 6 adapted for insertion in the bifurcated end of a handle member 7 and secured thereto by means of rivets or the like 8.

The shank, intermediate its ends, is formed with a conical flange 9 and the outer end of the shank is threaded as shown at 10. Threaded on the outer end of the shank is a disk 11 disposed in spaced relation with respect to the flat face of the flange 9 and mounted on the shank between the flange 9 and the disk 11 is a slidable tool carrier 12 adapted for free sliding movement between the flange and the disk.

The carrier 12 is provided with a plurality of radially extending segments 13 having slotted recesses 14 formed in the outer edge portions thereof and within which the intermediate portions of prongs 15 are positioned and pivotally mounted to the carrier by means of pins 16.

The prongs extend longitudinally with respect to the shank 5 and the outer ends of the prongs extend beyond the ends of the shank and are provided with barbs 17. The outer ends of the prongs are yieldably urged outwardly in a radial direction by means of coil springs 18 positioned in the recesses 14 with one end bearing against the carrier 12 and the other end of the springs bearing against the prongs at a point outwardly of the pins 16, as shown to advantage in Figure 1 of the drawings. The inner ends of the prongs 15 are curved inwardly as shown at 19 and are adapted for engagement by the conical flange 9 upon a movement of the carrier 12 in a direction toward the outer end of the shank 5. The disk 11 and flange 9 provide stops limiting movement of the carrier 12, and the disk and flange are of suitable diameter to partly close the slots 14 to prevent accidental displacement of the springs from the slots.

Accordingly, in the operation of the device the pipe cleaner is inserted in the end of the pipe, the springs 18 maintaining the outer ends of the prongs 15 against the inner surface of the pipe as the device penetrates into the same. When the stoppage or obstruction has been met the barbed ends of the prongs will plunge into the same and as the handle 7 is pulled outwardly of the pipe the carrier 12 will be moved in a direction toward the threaded disk 11 whereby the barbs 17 will be firmly embedded in the obstruction and thus facilitate the removal of the obstruction from the pipe.

It is believed the details of construction, manner of use and advantages of the invention will be readily understood from the foregoing without further detailed explanation.

Having thus described the invention, what I claim is:

A pipe cleaner comprising a shank, a fixed stop on the shank, an adjustable stop carried by the shank adjacent its outer end and adapted to be spaced from the fixed stop, a tool carrier slidably mounted on the shank between the stops, said carrier having a plurality of longitudinally extending slots in the edge thereof, a plurality of elongated tools pivotally attached to the carrier in said slots and having barbed outer ends projecting beyond the shank and spring means also positioned in said slots and engaging the tools at a point outwardly of their pivotal connections for yieldably urging said outer ends of the tools apart, said fixed stop engaging the inner ends of the tools for moving the outer ends thereof toward each other upon an inward movement of the shank relative to the carrier, and said stops partly closing the slots at opposite sides of the carrier to retain the springs against accidental displacement.

FRANK SURGES.